United States Patent Office 3,301,707

Patented Jan. 31, 1967

3,301,707

THIN FILM RESISTORS AND METHODS OF MAKING THEREOF

William E. Loeb, Martinsville, N.J., and David J. Valley, Cleveland, Ohio, assignors to Union Carbide Corporation, a corporation of New York No Drawing. Filed Dec. 27, 1962, Ser. No. 247,558
12 Claims. (Cl. 117—227)

This invention relates to thin film resistors. More particularly, this invention relates to an electrical resistor element in thin films comprising a vapor-deposited metal and a poly(p-xylylene).

Heretofore, resistors employed in electric circuitry have been limited to certain current-conducting high resistance elements, compounds, compositions and alloys. Carbon has most widely been employed for such applications but alloys of certain metals, as well as other compounds and compositions have found applications in electric circuitry. With the advent of miniaturized and microminiaturized electric circuitry, however, there is need for reducing the effective size of certain elements, particularly the resistors, capacitors and other bulky elements of amplification, rectification and attenuation circuits. Presently available materials of construction are not suitable for constructing microminiaturized resistors. In fact in many amplification, attenuation and rectification circuits, the resistors and capacitors have proven to be the bulkiest of the components, even greater in size by many times than the transistors and diodes employed therein.

According to the present invention, it has now been discovered that thin film resistors can now be prepared by forming an intimate dispersion of vapor-deposited conductive metal and a normally solid poly(p-xylylene). These compositions, as hereinafter more fully described, provide unique resistors having a temperature coefficient of resistance at least equivalent to that of carbon resistors but which can be prepared in thicknesses ranging from 50 A. thick on other insulative supports or substrates to self-supporting films having any desired thickness. As such, the thickness of the resistor per se is not critical. The most useful and practical benefits of this invention are served with such thin films in microminiaturized circuits which could not heretofore be made.

As another aspect of this invention, there is provided a method for the formation of resistor elements having any selected or desired resistance which comprises the steps of simultaneously depositing under reduced pressure a mixture of a vaporized normally conductive metal and a vaporous p-xylylene diradical in such ratios that the solid deposited matrix constitutes from about 25 to 75 percent by weight metal, the balance being a linear solid poly(p-xylylene). The particular vaporous diradical employed is not critical and can be substituted in any of the free valence positions with any inert substituents as hereinafter more specifically set forth. The vaporous mixture of metal and reactive diradicals readily condenses on any surface maintained below the ceiling condensation temperature of the diradical to yield an intimate mixture of metal and solid linear poly(p-xylylene). The condensation and instantaneous polymerization of the diradicals physically entraps the metal in atomic or nearly atomic dispersion, to form a film comprising a dispersion matrix which exhibits resistance to electric current flow, the resistance depending primarily on the amount of metal in the dispersion, as well as upon the thickness and size of the film.

Generally the metal should be present in the dispersion in an amount of at least 25 percent by weight, otherwise the resistance of the element is so high as to be almost an insulator. Also, it is desirable that there be present in the dispersion at least 25 percent by weight poly(p-xylylene) in order to adequately bond and entrap the metal and give sufficient strength to the resistor to enable it to be resistant to rubbing and abrasion. If it is desired to deposit the resistor dispersion on a temporary substrate from which the resistor film can be ultimately lifted off to form a self-supporting film, polymer concentration should be about 40 percent or more by weight.

Best results have been found in those materials having between about 30 percent to 60 percent by weight metal, the balance being the polymer.

It is not critical in this invention which particular metal is employed other than it should be an electrically conductive metal, and preferably is one easily evaporated and readily depositable by vacuum techniques. Those metals most readily deposited by vacuum evaporation normally have a vapor deposition rate of about $5\times10^{-6}$ grams per second per $cm.^2$ of surface at 1 micron pressure (absolute), and thus are most readily employable in this invention. Illustrative of such metals that lend themselves readily adaptable to the making of resistors are metals such as aluminum, gold, silver, copper, magnesium, zinc, tin, lead, chromium, cobalt, titanium vanadium manganese iron, nickel, platinum, tungsten, tantalum and other like metals. Any of such metals are electrically conductive for use in the resistors of this invention.

While any of such materials can be used, it is generally preferred that the metal be an excellent natural conductor in the solid state, i.e. have a resistivity less than $100\mu$ ohm centimeters, and more preferably less than $10\mu$ ohm centimeters such as for example silver, gold, copper, aluminum, and lead because less metal is required to give the desired conductance to the resistor. However, in most instances, the amount of metal needed is of minor importance as long as the matrix dispersion possesses the desired degree of resistance and other physical properties required of it for its intended end uses.

The physical appearance of the matrix dispersion of metal and polymer varies considerably and quite often, is different than that expected from the metal. Matrices of aluminum, zinc, lead, cadmium and lithium for example are black and smokey in appearance. Copper and germanium matrices on the other hand are clear and deep yellow whereas selenium and silver matrices are clear and red, blue or brown. These colors of course vary significantly depending on the amount of metal present, with the more intense and darker colors secured as the amount of metal in the polymer increases. At metal contents of about 50 percent by weight, most of the matrices appear black and smokey.

The resistance features of these matrices is believed due in part to the atomic or nearly atomic metal intimately dispersed in the polymer. It is only through the practice of the method described herein that such intimate dispersions can be secured. Attempts to employ finely ground metals and other conducting compositions have failed completely to provide thin resistors comparable to those secured herein. Principally, this is due to the unique manner by which these are made and to the unique properties imparted by the polymer phase.

In a preferred manner of carrying out the process of the present invention and making the resistors of the present invention, a high vacuum system is employed, generally one capable of maintaining a pressure of about 1 micron Hg absolute. To the chamber is provided a source of vaporous diradicals and located in the chamber is a high temperature melt pool for the melting and evaporating of the metal. The melt pool should be located such that there is no impeded flow of the metal vapors from the metal vapor source to the substrate to be coated. The metal vapors will deposit on any cool surface in direct line with the metal vapor source. The p-xylylene diradicals on the other hand will completely fill the chamber and deposit on any cool surface in the chamber regardless of the source or direction of source of the diradical vapors. In essence, they deposit much like moisture in a humid atmosphere, but unlike moisture, will have no tendency to flow or collect in heavier masses at the lowest points of the substrate. Thus practically, the polymer deposition gives a smooth even coating to all exposed substrate surfaces. As hereinafter set forth, the substrate should be cool or at least below the ceiling condensation temperature of the particular reactive diradical.

At the high temperature of the metal vapor source, the metal is vaporized and upon contacting the cool surface of the substrate, condenses at the same time that the p-xylylene diradicals are condensing, to thereby form a matrix dispersion of the metal in the polymer.

The method of this invention can be operated in a batchwise manner although it is particularly desirable for many applications to operate it in a continuous or semi-continuous manner. Depending on the results intended or desired, the substrate to be coated may be fixed in the chamber or it may be a continuously moving substrate inside the vacuum chamber. If desired, the moving substrate may be a web of paper or thermoplastic film serving as an insulator substrate or it may be a smooth and polished metal belt from which the resistor film is stripped after the deposition is complete.

The completed resistor film, be it supported on a substrate or as a self-supporting film can then have attached to it contacts or leads for use in electric circuits. While many obvious ways of attaching contacts or leads are possible, such as with metal foil tabs adhered on with conductive cements or paints, it is desirable to vapor deposit metal contact strips or tabs on the substrate by suitable masking techniques in the coating chamber, or to use a substrate of thermoplastic film having metal contact edges such as by foil lamination or by metal vapor deposited edges. Either can be employed as the polymer coating in the deposition chamber also protects and surrounds the contact or leads from subsequent abuse.

The polymers employed herein in these resistive elements are unique in that they are not only excellent dielectrics, but also that they have melting points generally greater than 200° C.–300° C. and are insoluble in all common organic solvents at room temperature. In fact, only such solvents as alphachloronaphthylene, and chlorinated biphenyl have shown any solubilizing activity on them even at the boiling point of the solvent. Similarly, the polymers are unaffected by water, strong bases, strong alkalies and other such chemicals. Yet these polymers can be easily deposited in pin hole-free films of extremely thin sections.

The poly(p-xylylenes) employed in this invention are secured by the condensation of vaporous diradicals having the Formula I set forth below. These diradicals are quite stable in the vapor phase at temperatures above 200°–250° C. Upon cooling, the diradicals condense and immediately polymerize into the linear polymer of Formula II. Each different diradical tends to have its separate condensation temperature generally ranging from about 25° C. to about 200° C. or slightly above depending to a degree on the ambient pressure of the system.

These diradicals can be made by either of several techniques. The method found most convenient and preferred is by the pyrolysis at temperatures between 450° C. and 700° C. of at least one cyclic dimer represented generally by the structure

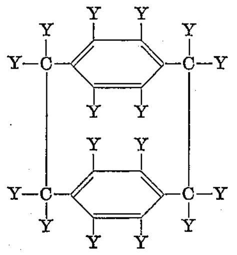

wherein Y is an inert substituent but is preferably hydrogen, halogen or an organic group, preferably a hydrocarbon group. On pyrolysis, the dimer cleaves into two separate reactive vaporous diradicals, each having the structure

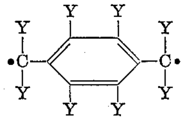

Formula I

Thus where all the Y groups are hydrogen, or where the nuclear substituents on each diradical are the same, two moles of the same p-xylylene diradical are formed, and when condensed, yield a substituted or unsubstituted p-xylylene homopolymer. When the aromatic nuclear substitutents are different, two different diradicals are formed, condensation of such diradicals will yield copolymers as hereinafter set forth.

Alpha substituted p-xylene diradicals are also prepared by the prolysis of an aryl bis-sulfone of the structure

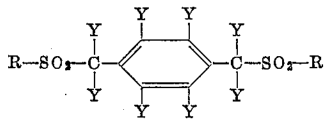

where R is a lower hydrocarbon group, and Y is a nonpolar substituent. These sulfones pyrolyze in heating to temperatures of about 600°–1000° C. into sulfur dioxide and the reactive diradical

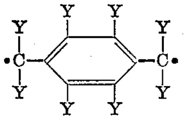

(I)

as is disclosed in copending application Serial No. 232,253, entitled "Decomposition of Bis-Sulfones," filed October 22, 1962, now abandoned, which is included herewith by reference. This technique is partciularly desirable for introducing alpha halo substituent groups in the polymer, outstanding of which is the highly thermal stable poly($\alpha,\alpha,\alpha',\alpha'$-tetrafluoro-p-xylylene).

Reactive diradicals are also prepared by the pyrolysis of a diaryl sulfone of the structure

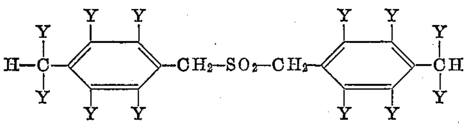

wherein Y is a non-polar substituent. These sulfones pyrolyze on heating to temperatures of about 400°–800° C. into sulfur dioxide and 2 moles of a monoradical of the formula

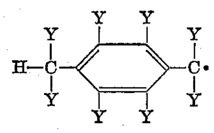

which disproportionates into a p-xylene and a diradical of the structure

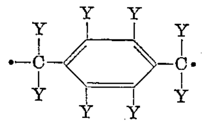

(I)

as is disclosed in copending application Serial No. 232,247, entitled "Diarylsulfones and Process for the Pyrolysis Thereof to the Corresponding Diarylethanes and Polymers," filed October 22, 1962, now Patent No. 2,235,516, which is herewith included by reference.

Any other technique of making the vaporous diradicals can of course be used. Since some of these techniques produce other gaseous by-products (such as $SO_2$) and since certain of the metals employed may be subjected to attack by such by-products, care should obviously be used in selecting the metal to be deposited when employing such reactive diradicals by other diverse means. Since the pyrolysis of the cyclic dimer di-p-xylylene involves no other by-products and the dimer cleaves quantitatively into two moles of the reactive diradical, this method is most preferred.

Inasmuch as the coupling and polymerization of these reactive diradicals upon the condensation of the diradicals does not involve the aromatic ring, any unsubstituted or substituted p-xylylene polymer can be employed since the substituent groups function essentially as an inert group. Thus, the substituent group can be any organic or inorganic group which can normally be substituted on aromatic nuclei, or on the aliphatic alpha carbon atoms.

As employed herein, in the term "p-xylylene diradical" is intended to encompass the chemical compounds having one free radical site on each of two alpha atoms attached in para position to an aromatic nucleus, such as is represented by the structure

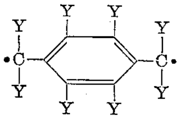

FORMULA I in which Y can represent any inert monovalent group, as hereinafter more fully described. These p-xylylene diradicals are stable in the vaporous state but will condense into thin void free film of a solid polymer, termed herein "poly(p-xylylene)" which can be characterized by the structure

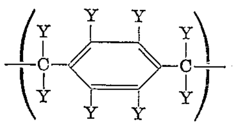

FORMULA II also more fully described hereinafter.

For example polymers have been made wherein the Y group has been halogens including chlorine, bromine, iodine and fluorine on either the ring or alpha carbon atoms, hydrocarbon groups such as methyl, ethyl, propyl, phenyl and like groups, cyano, carboxyl, carbalkoxy groups, amino groups and the like. While some of these have been found to offer certain collateral benefits such as toughness viz. poly(2-chloro-p-xylylene), or high temperature resistance, viz. poly($\alpha,\alpha,\alpha',\alpha'$ - tetra - fluoro-p-xylylene), none of these substituent groups appear to significantly affect the resistivity of the matrix over and above that of the poly(p-xylylene) itself. Thus for most applications and uses herein, the poly(p-xylylene) i.e. where all Y groups are hydrogen, and the poly(chloro-p-xylylene) i.e. where one Y group on the ring is chlorine, all others being hydrogen, are most preferred as being the easiest and least expensive to make.

The substituted di-p-xylylenes from which these reactive diradicals are prepared, can be prepared from the cyclic dimer, di-p-xylylene, by appropriate treatment, such as halogenation, alkylation and/or oxidation and reduction and like methods of introduction of such substituent groups into aromatic nuclei. Inasmuch as the cyclic dimer is a very stable product up to temperatures of about 400° C., elevated temperature reactions can also be employed for the preparation of various substituted materials. Hereinafter the term "di-p-xylylene" refers to any substituted or unsubstituted cyclic di-p-xylylene as hereinabove discussed, and the term "p-xylylene diradical" refers to any substituted or unsubstituted p-xylylene structure having two free radicals on the alpha carbon atoms as hereinabove discussed.

In the polymerization process, the vaporous diradicals condense and polymerize nearly instantaneously at the condensation temperature of the diradicals. The coupling of these diradicals involves such low activation energy and the chain propagation shows little or no preference as to the particular diradical, so that steric and electronic effects are not important as they are in vinyl polymerization. The substituted and/or unsubstituted p-xylylene homopolymers can be made by cooling the vaporous diradical down to any temperature below the condensation temperature of the diradical. It has been observed that for each diradical species, there is a definite ceiling condensation temperature above which the diradical essentially will not condense and polymerize. All observed ceilings of substituted p-xylylene diradicals have been below about 200° C. but vary to some degree upon the operating pressure involved. For example, at 0.5 mm. Hg pressure, the optimum condensation and polymerization temperatures observed for the following diradicals are:

| | ° C. |
|---|---|
| p-Xylylene | 25–30 |
| Chloro-p-xylylene | 70–80 |
| n-Butyl-p-xylylene | 130–140 |
| Iodo-p-xylylene | 180–200 |
| Dichloro-p-xylylene | 200–250 |
| Tetra-$\alpha,\alpha,\alpha',\alpha'$-fluoro-p-xylylene | 35–40 |

Thus, by this process, homopolymer resistive films are made by maintaining the substrate surface at a temperature below the ceiling condensation temperature of the particular diradical specie involved, or desired in the homopolymer. This is most appropriately termed "homopolymerizing conditions."

Where several different diradicals existing in the pyrolyzed mixture have different vapor pressure and condensation characteristics, as for example p-xylylene and chloro-p-xylylene and dichloro-p-xylylene or any other mixture with other substituted diradicals, homopolymerization will result when the condensation and polymerization temperature is selected to be at or below that temperature where only one of the diradicals condense and polymerize. Thus, for purposes within this application, the terms "under homopolymerization conditions" are intended to include those conditions where only homopolymers are formed. Therefore it is possible to make homopolymers from a mixture containing one or more of the substituted diradicals when any other diradicals present have different condensation or vapor pressure characteristics, and wherein only one diradical specie is condensed and polymerized on the substrate surface. Of course, other diradical species not condensed on the substrate surface can be drawn through the apparatus as hereinafter described, in vaporous form to be condensed and polymerized in a subsequent cold trap.

Inasmuch as unsubstituted p-xylylene diradicals, for example, are condensed at temperatures about 25° to 30° C., which is much lower than chloro-p-xylylene diradicals, i.e., about 70° to 80° C. it is possible to have present such diradicals in the vaporous pyrolyzed mixture along with the chlorine-substituted diradicals. In such a case, homopolymerizing conditions are secured by maintaining the substrate surface at a temperature below the ceiling condensation temperature of the substituted p-xylylene but above that of the p-xylylene, thus permitting the p-xylylene vapors to pass through the apparatus without condensing and polymerizing but collecting the poly(p-xylylene) in a subsequent cold trap.

It is also possible to obtain substituted copolymers through the pyrolysis process hereinabove described. Copolymers of p-xylylene and substituted p-xylylene diradicals, as well as copolymers of different substituted p-xylylene diradicals wherein the substituted groups are all the same but each diradical containing a differing number of substituent groups can all be obtained through said pyrolysis process.

Copolymerization occurs simultaneously with condensation upon cooling of the vaporous mixture of reactive diradicals to a temperature below 200° C. under polymerization conditions.

Copolymers can be made by maintaining the substrate surface at a temperature below the ceiling condensation temperature of the lowest boiling diradical desired in the copolymer, such as at room temperature or below. This is considered "copolymerizing conditions," since at least two of the diradicals will condense and copolymerize in a random copolymer at such temperature.

In the pyrolytic process of a di-p-xylylene, the reactive diradicals are prepared by pyrolyzing the substituted and/or unsubstituted di-p-xylylene at a temperature between about 450° and 700° C., and preferably at a temperature between about 550° C. to about 600° C. At such temperatures, essentially quantitative yields of the reactive diradical are secured. Pyrolysis of the starting di-p-xylylene begins at about 450°–550° C. but such temperatures serve only to increase time of reaction and lessen the yield of polymer secured. At temperatures above about 700° C. cleavage of the substituent group can occur, resulting in a tri- or polyfunctional species causing cross-linking and highly branched polymers.

Pyrolysis temperature is essentially independent of the operating pressure. It is, however, necessary that reduced or subatmospheric pressures be employed for successful codeposition in the same chamber or system with the metal. For most operations, pressures within the range of 0.01 micron to 10 mm. Hg are most practical for pyrolysis. Likewise if desirable, inert vaporous diluents such as nitrogen, argon, carbon dioxide, water vapor and the like can be employed to vary the optimum temperature of operation or to change the total effective pressure in the system.

Operating pressure in the system for successful codeposition of the metal vapor and the p-xylylene diradicals in the same system depends of course on the particular metals selected. As expected, the metals evaporating at lower temperatures are most easily employed in this process, i.e. those having an evaporation temperature of less than 1200° C. at 10 microns pressure. However, with adequate precautions and equipment it is possible to vaporize any metal by this technique.

It is contemplated in this invention to employ these thin film resistors to applications of many sorts. For example, it is possible for self-supporting resistance films to be wound up in a coil or roll to make the path of the resistor quite long. For such applications, it is desirable to coat a substrate with an insulative layer of the polymer before depositing the resistor film. After sufficient thickness of the resistor film matrix of metal and polymer is built up in this film, it can be stripped off the substrate and wound up into a coil or roll and leads attached to the ends and at any desired intermediate point, if desired. Thin films of 0.05–0.1 mil can easily be handled in this manner, as can of course much thicker films. For adequate strengths, films of 1 mil or more are most preferred.

Masking of pre-printed circuits where the resistor films are to be laid down only in the specified unmasked area permits these thin film resistors to be used in the supported manner (i.e. non-self-supporting). This permits the films to be employed in thicknesses of 100–500 A. if desired, although films of 1000–5000 A. are more preferred even when supported. These thicker films provide a greater resistance to rubbing and abrasion and hence are more adaptable to later handling and treatment.

It is, of course, also possible by intricate masking techniques to lay down layers of either the poly(p-xylylene) or the metal or both simultaneously so as to make intricate thin-film printed circuits of any type following this technique.

The following examples will serve to illustrate the invention. Unless otherwise indicated, all parts and percentages are by weight.

EXAMPLES 1–14

Metal and p-xylylene diradicals were simultaneously cooled onto glass substrate in an eighteen inch diameter vacuum chamber in which there was located the metal vapor source and to which was connected a diradical producing furnace.

The diradical source consisted of a model M–2012 Hevi-Duty tube sublimation furnace 12 inches long connected to a model M–2024 Hevi-Duty cleavage furnace through a common 1½ inch schedule D, type 310 stainless steel pyrolysis tube. The sublimation furnace was set to maintain a temperature of about 180° C. to sublime the di-p-xylylene and the cleavage furnace set to maintain a temperature of about 620° for the cleavage of the di-p-xylylene into the reactive diradicals. Heating tapes (250° C.) were placed around all exposed portions of the stainless tube to prevent condensation of the reactive diradicals on walls thereof. An alumina crucible, closely fitting to the internal diameter of the reactor tube was placed near the end of the subliming furnace to prevent any backstreaming of the vaporized di-p-xylylene.

The metal vapor source was a machined graphite tube (grade ATJ) ⅜" I.D. x ½" O.D. x 1" long. The resistance under operating conditions was 0.0125 ohm and had a power consumption of 1800 watts. End pieces were connected to ½" diam. braided copper wires which were attached inside the vacuum chamber to the electrical terminal feed-throughs. The terminals were water-cooled.

In the following experiments, 1 inch x 3 inch soft glass microscope slides were used as the substrates. They were first cleaned with acetone and detergent solution in an ultrasonic bath, rinsed with distilled water and dried in an oven at 150° C. for 10 minutes. Electrically conductive gold lands about ¼" wide were deposited along the long edges of the slides by vacuum evaporation and deposition of gold. To provide good adherence to the glass, an undercoat of chromium was made and then a layer of gold about 700 A. thick was deposited. The slides were recleaned as above just before use.

The slides were set-up inside the vacuum chamber to be in direct line with the metal vapor source and the diradical source. Leads to the conductive lands of the slides were connected to a vacuum tube ohmmeter outside the chamber to monitor the resistance of the deposited film. It is highly desirable to monitor and insure a homogeneous blend of metal and poly(p-xylylene) in the deposited film. The ohmmeter had an upper detection limit of 1000 megohms.

Before sealing up the unit, one gram of the indicated metal was placed in the metal vapor source tube and five grams of the appropriate di-p-xylylene was placed in the crucible in the sublimation zone.

After sealing the vacuum chamber, vacuum was applied by mechanical pumps connected through a 6" diffusion pump and a liquid nitrogen vapor trap immediately outside the vacuum chamber. The chamber was evacuated to a pressure of $5 \times 10^{-4}$ torr.

The cleavage furnace and heating tapes were turned on and heated to 620° C. and 250° C. respectively. The sublimation furnace (at 180° C.) and the current to the metal vapor source were turned on, the latter after the chamber pressure had risen to 30 microns, caused by diradicals produced in the chamber.

After three to five minutes, a resistance change was noted on the ohmmeter monitor. The metal-source temperature was then regulated to give the desired rate of resistance change. The resistance change is very rapid at first, taking only three seconds to go from 1000 megohms to 1 megohm but later decreases, taking ten minutes from 1000 ohms to 1 ohm. These conditions were maintained until the monitor resistance dropped to the desired value of about 5–100 ohms (i.e. 25–5000 ohms/square).

Results of these samples are indicated in Table I attached.

In order to determine the stability and permanence of the thus deposited resistive films, some of the samples were heat treated in an inert atmosphere at temperatures from 75° C. to 250° C. for periods of one to two hours and the temperature coefficient of resistance measured as shown in Table II following.

The color of these resistance films ranged from blue-gray semi-transparent to opaque lustrous blue and greens and metallic silver in appearance as the thickness increased. The absolute thickness of the films as indicated was measured interferometrically or by surface profilometer technique employing a mechanical stylus. Masking of the substrate glass plate with a second tightly fitting thin glass plate produces a step sufficiently sharp to make the measurement possible. A qualitative estimate of thickness based upon visual examination is shown for the other films.

The resistivity was calculated for those films whose absolute thickness was determined. The resistivity of Example 3 was estimated on the basis of the chemical analysis and film weight. The resistivity and other data are shown in Table I. It is well shown by these samples, whose compositions were deliberately altered, that a wide range of resistivity is possible.

In Table II following, the TCR (temperature coefficient of resistance) of several of these films is shown, one of which was heat treated and others of which were not.

EXAMPLE 15

A 3″ x 18″ glass coating chamber connected to a diradical generator and vacuum pumps was employed in these examples. The diradical generator consisted of a sublimation zone heated to 180° C. connected to a cleavage or pyrolysis zone operated at 650° C. through a common 1½″ I.D. x 25″ long Vycor glass tube. The vacuum pump unit consisted of 5 c.f.m. mechanical pump connected through a 2″ oil diffusion pump and Dry Ice trap to the coating chamber. Copper wire leads were sealed vacuum-tight into the walls of the coating chamber and were connected inside the chamber to a tungsten filament coil pool for evaporation of metal. The indicated metal was placed inside the tungsten coil pool before the coating chamber was closed.

Di-p-xylylene or the substituted di-p-xylylene was placed in a glass tube in the sublimer zone; usually about 5.0 grams was used. The external leads of the tungsten pool were connected to the terminals of a current transformer and Variac controller and the system evacuated to an ultimate pressure of about 1 micron Hg absolute.

The heat to the pyrolysis zone was turned on until a stable temperature of about 650° C. and desired operating pressure was reached. The temperature in the sublimation zone was then increased to about 180° C. As the dimer vapors went through the pyrolysis zone, they were cleaved quantitatively to the corresponding reactive diradical indicated and were fed to the coating chamber, and the pressure in the coating chamber increased to about 30 microns Hg.

The diradicals were condensed on the walls of the coating chamber (maintained at room temperature) and simultaneously polymerized to form a clear tough substrate film on all of the cold walls of the chamber. In order to prevent deposition on the tungsten coil and the metal in it, a small current was kept flowing through this circuit so as to keep its temperature above 250° C.

To aid in the subsequent removal of film from the walls of the coating chamber, it was found desirable to employ a silicone mold release agent on the surfaces.

*Table I*

| Example | Diradical | Metal | Percent Metal | Thickness, A. | Sheet Resistance, Ω sq. | Resistivity, μ Ω cm. | Optical Density | Rub Resistance* |
|---|---|---|---|---|---|---|---|---|
| 1 | Chloro p.xylylene | Zn | ------ | 2,000 | 400 | 8,000 | Semi-transparent | |
| 2 | do | Ge | ------ | ------ | 800 | ------ | do | |
| 3 | do | Mg | ------ | ------ | 900 | ------ | do | |
| 4 | p-Xylylene | Ag | 40 | 20 | 10 | 2,000 | Opaque | Very good. |
| 5 | Chloro p-xylylene | Ag | ------ | ------ | 55 | ------ | Semi-transparent | |
| 6 | p-Xylylene | Ag | 40 | 8,000 | 70 | 5,600 | Opaque | Do. |
| 7 | do | Ag | 55 | 5,260 | 25 | 1,300 | do | Do. |
| 8 | do | Ag | ------ | ------ | 25 | ------ | do | Good. |
| 9 | do | Ag | 57 | 1,030 | 90 | 950 | Semi-transparent | Fair. |
| 10 | do | Ag | 54 | 2,200 | 40 | 900 | Near opaque | Do. |
| 11 | do | Ag | ------ | ------ | 40 | ------ | Semi-transparent | |
| 12 | do | Ag | ------ | ------ | 80 | ------ | do | Do. |
| 13 | do | Ag | 72.4 | 1,400 | 13 | 180 | do | Poor. |
| 14 | do | Ag | 89.0 | 1,000 | 7.15 | 70 | do | Do. |

*Determined by rubbing with thumb.

*Table II*

TEMPERATURE COEFFICIENT OF RESISTANCE

| Example No. | Heat Treatment | −55° C. | −15° C. | 65° C. | 100° C. |
|---|---|---|---|---|---|
| 5 | None | 880 | 1,680 | 650 | 400 |
| 10 | do | 1,460 | 1,380 | 670 | −300 |
| 12 | do | 240 | 590 | 360 | 150 |
| 11 | do | 770 | 1,460 | 1,700 | 1,600 |
| 8 | do | 720 | 690 | 450 | 570 |
| 9 | do | 560 | −220 | 1,220 | 1,240 |
| 7 | 75° C.—1 hr. | 1,180 | 1,140 | 1,720 | 1,440 |

The values vary slightly but are generally positive (metallic). The few negative values may have resulted from irreversible negative changes in resistance. The best of these have TCR's better than that of carbon composition resistors.

After sufficient polymer was deposited to form a substrate, the current to the tungsten filament coil increased until the metal began to evaporate, as shown by the formation of a mirror or smokey film on the surface of the previously deposited plastic film. Operation in this manner was continued until the vacuum gauge indicated a decrease in the pressure back to about 1 micron indicating exhaustion of the di-p-xylylene in the sublimer zone.

The heat to the metal vaporization pool in each of these examples was not measured, but was controlled by the Variac so as sufficient to vaporize the metal and have it deposit with the polymer in the matrix as determined visually by the color change on the walls of the coating chamber.

At the completion of the deposition, all heating units were shut down and the unit permited to cool, after which vacuum was released and the coating chamber opened up.

In each instance the total thickness of the composite film was over 0.1 mil thick and was readily stripped from the walls of the coating chamber by hand.

The following table illustrates the properties of the metal-polymer matrices made in this example in which P indicates polymer deposition alone and D represents dispersion matrix deposition. In certain examples, a top coating of polymer was applied over the dispersion matrix as a further protection layer for the dispersion matrix, by shutting off the heat to the tungsten pool prior to the exhaustion of the di-p-xylylene in the sublimation chamber. In these instances, the structure is indicated as "P–D–P" indicating a polymer-dispersion-polymer type laminate. In still others, the dispersion matrix was deposited first then a polymer interlayer and then a subsequent dispersion layer as indicated "D–P–D" in the table.

*Table III*

CODEPOSITION OF METAL-POLYMER MATRICES

| Diradical Used | Metal | Structure Produced | Remarks |
|---|---|---|---|
| Chloro-p-xylylene | Al | P–D [a] | |
| Do | Pb | P–D–P | |
| Do | Cu | P–D–P | Clear, yellowish film. |
| Do | Se | P–D–P | Clear, red film. |
| Do | Ge | P–D–P | Pale yellow films. |
| Do | Pb | P–D–P | Black, or smokey-gray opaque films. |
| Do | Cu | P–D–P | Dark yellow film. |
| Do | Ag | P–D–P | Clear, red films. |
| Do | Ag | P–D | Do. |
| Do | Pb | D–P–D | Silvery grey mirrors on surfaces. |
| p-Xylylene | Pb | D–P–D | |
| Do | Pb | D–P–D | |
| Do | Pb | D | |
| Do | Pb | D | |
| Dichloro-p-xylylene. | Pb | D | |
| Do | Cd | D | |
| Chloro-p-xylylene | Cd | D | |
| Dichloro-p-xylylene. | Cu | D–P | |
| Chloro-p-xylylene | Pb | P–D | |
| Dichloro-p-xylylene. | Pb | P–D | Not bleached by conc. $H_2SO_4$. |
| Do | Cu | P–D–P | |
| Do | Ag | P–D–P | |
| Chloro-p-xylylene | Se | P–D | |

[a] P=polymer, D=dispersion of metal in polymer as the resistor.

What is claimed is:

1. A method for making a resistor element which includes the step of simultaneously condensing and depositing under reduced pressure, a mixture of a vaporized normally conductive metal and a vaporous p-xylylene diradical, in such ratios that the solid deposited matrix constitutes from about 25 to 75 percent by weight metal, the balance being a linear solid poly(p-xylylene).

2. A method for making a resistor element which includes the steps of condensing and depositing under reduced pressure, a mixture of a vaporized normally conductive metal and a vaporous p-xylylene diradical onto a rigid substrate in such ratios that the solid deposited matrix constitutes from about 25 to 75 percent by weight of metal, the balance being linear solid poly(p-xylylene) and thereafter stripping the matrix from the substrate.

3. A method according to claim 2 wherein the poly(p-xylylene) constitutes at least about 40 percent by weight of the matrix.

4. A method for making a resistor element which includes the steps of pyrolyzing a cyclic di-p-xylylene under reduced pressure and condensing and depositing on a cool substrate the vaporous p-xylylene diradicals thus formed simultaneously with a vaporized normally conductive metal in such ratios that the solid deposited matrix constitutes from about 25 to 75 percent by weight metal, the balance being a linear solid poly(p-xylylene).

5. A method according to claim 4 wherein the metal has a normal resistivity less than 100 $\mu$ohm centimeters.

6. A method according to claim 5 wherein the poly(p-xylylene) constitutes at least about 40 percent by weight of the matrix, and the thus formed matrix film is stripped from the condensing substrate.

7. A resistor element comprising an intimate dispersion matrix of a nearly atomic dispersion of a normally conductive metal and a normally solid poly(p-xylylene) containing from 25 to 75 percent by weight metal, the balance being the linear solid poly(p-xylylene).

8. A resistor element comprising an intimate dispersion matrix of a nearly atomic dispersion of a metal having a normal resistivity less than about 100 $\mu$ohm centimeters containing from 25 to 75 percent by weight metal, the balance being the linear solid poly(p-xylylene).

9. A resistor film having a thickness of at least 50 A. units comprising an intimate dispersion matrix of a nearly atomic dispersion of a normally conductive metal and a normally solid poly(p-xylylene), containing from 25 to 75 percent by weight metal, the balance being the linear solid poly(p-xylylene).

10. A resistor film as described in claim 9 wherein the metal is present in an amount between 30 and 60 percent by weight of the matrix.

11. A self-supporting resistive film as defined by claim 9 having at least 40 percent by weight of a poly(p-xylylene) and of sufficient thickness to be self-supporting.

12. A resistive film as defined by claim 9 supported on an insulative support.

References Cited by the Examiner

UNITED STATES PATENTS

| | | | |
|---|---|---|---|
| 2,143,723 | 1/1939 | Walker et al. | 117—119 |
| 2,792,620 | 5/1957 | Kohring | 29—155 |
| 2,803,729 | 8/1957 | Kohring | 264—81 |
| 2,827,536 | 3/1958 | Moore et al. | 29—155 |
| 2,849,583 | 8/1958 | Pritikin | 117—119 |
| 2,926,325 | 2/1960 | Moore et al. | 338—308 |
| 2,950,995 | 8/1960 | Place et al. | 117—227 |
| 3,107,337 | 10/1963 | Kohring | 338—308 |
| 3,134,689 | 5/1964 | Pritikin et al. | 117—212 |

RICHARD M. WOOD, *Primary Examiner.*

A. H. BRODMERKEL, J. H. WOO, V. Y. MAYEWSKY, *Assistant Examiners.*